United States Patent [19]

Fernandez

[11] Patent Number: 4,477,282

[45] Date of Patent: Oct. 16, 1984

[54] NONPIGMENTED WOOD STAINS

[75] Inventor: Julio A. Fernandez, Caledon, Canada

[73] Assignee: National Starch and Chemical Corporation, Bridgewater, N.J.

[21] Appl. No.: 494,237

[22] Filed: May 13, 1983

Related U.S. Application Data

[63] Continuation-in-part of Ser. No. 325,145, Nov. 27, 1981, abandoned.

[30] Foreign Application Priority Data

Jun. 23, 1981 [CA] Canada ................................. 380452

[51] Int. Cl.$^3$ ................................................ C09K 3/00
[52] U.S. Cl. ......................................... 106/34; 8/402
[58] Field of Search ...................... 106/34; 8/402, 611

[56] References Cited

U.S. PATENT DOCUMENTS

| | | | |
|---|---|---|---|
| 3,933,422 | 1/1976 | Saad | 8/10.1 |
| 4,187,072 | 2/1980 | Fernandez | 8/6.5 |
| 4,195,973 | 4/1980 | Hertel et al. | 8/46 |
| 4,286,955 | 9/1981 | Lewis | 8/115.6 |

Primary Examiner—Paul Lieberman
Assistant Examiner—Amelia B. Yarbrough
Attorney, Agent, or Firm—Edwin M. Szala; Ellen T. Dec

[57] ABSTRACT

Nonpigmented wood stains suitable for use on unprimed hardwood surfaces are prepared from aniline dyestuffs and a solvent by the addition of cellulose ethers thereto. In a preferred embodiment the stains additionally contain dibenzylidene sorbitol as a gellant.

13 Claims, No Drawings

NONPIGMENTED WOOD STAINS

CROSS-REFERENCE TO RELATED APPLICATIONS

This is a continuation-in-part of my co-pending application Ser. No. 325,145 filed Nov. 27, 1981, now abandoned.

BACKGROUND OF THE INVENTION

This invention relates to improved nonpigmented wood stains suitable for use on unprimed hardwood surfaces. In a preferred embodiment, the invention relates to such improved stains which are supplied in gelled form.

In U.S. Pat. No. 4,187,072, issued Feb. 5, 1980 to J. Fernandez, there is disclosed a novel nonpigmented aromatic alcohol-based wood stain prepared in gelled form from aniline dyestuffs, benzyl alcohol as solvent and dibenzylidene sorbitol as gellant therefor. While these wood stains provide superior ease of application and penetration on hard wood surfaces, their use often requires the application of a primer, such as a coat of Danish oil, in order to obtain superior performance as disclosed in the aforementioned patent.

The need for a priming coat is due to several factors, one of which has to do with coniferous woods. When the stains of the aforementioned patent are applied directly onto unprimed softwoods, "fish-eye" or spots develop which are less frequently seen on hardwoods. The cause of these spots is surmised to arise from uneven wetting around resin-laden areas in the softwoods. It has therefore been found necessary in using these stains to first prime the wood surface to be stained with a penetrating oil such as Danish or Teak oil or another primer in order to avoid faults in the final stained surface.

While the use of a primer on a softwood surface has one side benefit, i.e. it develops a greater range of color densities and therefore a better overall development of subtle patterns of the wood, its use on hardwoods has a generally detrimental effect. It renders it difficult for the user to obtain very deep shades in hardwood finishes since the oil coating prevents penetration of sufficient stain to obtain the desired darker tones. Moreover, the use of a primer on hardwoods as ash and oak often results in an undesirable "zebra-like" pattern caused by differences in tracheid sizes of the early and late wood areas of the surface being stained.

It is therefore an object of the present invention to provide a non-pigmented gelled wood stain formulation which does not necessitate the use of a primer regardless of the type of wood surface to be treated.

It is also an object of the invention to provide a nonpigmented nongelled wood stain formulation which does not require the use of primers to ensure uniform penetration.

These and other objects will be apparent from the disclosure and examples which follow.

SUMMARY OF THE INVENTION

Improved stain formulations suitable for use on unprimed wood surfaces may be prepared by the addition of 0.2 to 10% of a cellulosic polymer to the nonpigmented stains containing a slow drying solvent. These formulations are particularly adapted for use in the form of gelled nonpigmented stains as disclosed in U.S. Pat. No. 4,187,072 (cited previously).

More specifically, in one aspect, the present invention provides a nonpigmented wood stain composition comprising:

(a) from 0.1 to 10% by weight of at least one solvent soluble dye;

(b) at least one cellulosic polymer in an effective amount ranging from 0.2 to 10% by weight; and (c) from 0 to 10% by weight of dibenzylidene sorbitol;

(d) the remainder of the composition comprising a suitable solvent.

In accordance with a second aspect of the invention, a process for staining wood is provided, which comprises applying thereto a nonpigmented wood stain composition comprising:

(a) from 0.1 to 10% by weight of at least one solvent soluble dye;

(b) at least one cellulosic polymer in an effective amount ranging from 0.2 to 10% by weight; and (c) from 0 to 10% by weight of dibenzylidene sorbitol; and (d) the remainder of the composition comprising a suitable solvent.

The resultant stain, preferably in gelled semi-solid form, may be readily applied by brushing or wiping on any type of wood surface without the need for any pre-treatment with primer. Furthermore, the stain may be applied in multiple layers so as to achieve a shade having any degree of darkness desired.

Further improvements in the preferred stain formulations of the present invention over those of U.S. Pat. No. 4,187,072 arise from the synergistic combination of specific cellulosic polymers with the gellant and are manifested by a lesser tendency of the gel to "crumble" when stressed during application and by the lowering of the threshold level of gellant required to form a gel. Furthermore, the use of the cellulosic polymer enables the formulation of a stain using lower levels of dye to achieve comparable color density since there is a greater degree of dye penetration into the unprimed wood surfaces.

Another advantage which is afforded by the use of the stains here described resides in the uniformity of the appearance of the stained wood surfaces with lesser demarkation between the areas of early and late wood growth. Thus, particularly in hardwoods such as ash and oak, the differences in sizes of the tracheids or canals which appear in the wood at various stages of its growth can be quite large ranging from 5 to 6 microns in early wood to 300–500 microns in late wood. When a Danish oil primer is applied over such woods, the smaller tracheids are sealed and are then less able to accept dye-stuff which is readily absorbed by the larger tracheids resulting in a zebra-like appearance emphasizing the differences in grain pattern of the wood.

DETAILED DESCRIPTION OF THE PREFERRED EMBODIMENTS

The cellulosic polymers useful as fixatives herein include all cellulosic derivatives which are soluble in the particular solvent employed. Representative derivatives include ethyl cellulose, methyl cellulose, hydroxy ethyl cellulose, ethyl hydroxy ethyl cellulose, hydroxy propyl cellulose, hydroxy butyl methyl cellulose, etc. The $C_3$ and $C_4$ substituted cellulose ethers are particularly suited for the new stains because of their excellent solubility in the preferred solvents and because they are available in the very high molecular weights useful for lowering the threshold level of the gellant. Derivatives having average molecular weights within the range of 750,000 to 125,000,000 are therefore most preferred. The levels at which these fixatives have been found to be effective vary depending upon the molecular weight chosen and consequently the viscosity of the particular derivative. In general when high molecular weight cellulosic polymers are used levels of 0.2 to 10% by weight are employed, with preferred levels of 0.5 to 1.6%. When low molecular weight polymers (such as ethyl cellulose 100 cps in 2% solvent solution) are used, higher minimum levels of at least about 2% may be required. Representative commercially available products useful herein include Tylose MH (methyl hydroxy ethyl cellulose from Berol Corp.), Klucel H (hydroxypropyl cellulose from Hercules Corp.) and Cellosize (hydroxyethyl cellulose from Union Carbide) as well as the Methocel and Ethocel series of cellulose ether products available from Dow Chemical. In particular, we have found the Cellosize, Klucel H and blends of Methocel and Ethocel to be especially useful herein.

The remaining components are those as are employed in U.S. Pat. No. 4,187,072, the disclosure of which is incorporated herein by reference.

Any of the conventional solvent soluble dyes including those dyes listed in the Color Index of the Textile Dyers Association as solvent soluble dyes may be used in the present stain formluations. The most commonly employed of such dyes include the following: Walnut R, Golden Oak, Bismarck Brown, Black Nigrosine W.N., Green MX Crystals, Methylene Blue 2B1, Fuchine Magenta R.T., Violet 3BPN, Orasol Brown 2RG, Orasol Brown GR, Orasol 5R, Orasol Black BA, Neozapon Yellow GG, Neozapon Brown BE, Neozapon Red BE, Neozapon Orange G, etc. These dyes are generally available under the Neozapon and Orasol trade names from Badische Aniline and Soda-Fabrik and Ciba-Geigy respectively. Blends of one or more of the above with other benzyl alcohol soluble dyes may also be used. The total amount of dye employed will generally be within the range of 0.1 to 10%, preferably 3 to 8%, by weight of the total formulation.

The exact chemical structure of the dibenzylidene sorbitol used as a gellant in the preferred formulations is not know with certainty; it is, however, believed to be a mixture comprising a major proportion of dibenzylidene sorbitol with minor amounts of monobenzylidene sorbitol and tribenzylidene sorbitol. It may be prepared, for example, by adding benzaldehyde to an aqueous solution of sorbitol in an amount of 1 to 3 moles benzaldehyde per mole sorbitol. The reaction is carried out under acidic conditions whereby the pH is maintained at about 1 by the addition of, for example, sulfuric or phosphoric acid and the temperature at about 25° C. by cooling. The solid product is separated by filtration from the washed reaction mixture, washed with water and dried. This method is described in detail in U.S. Pat. No. 3,721,682 issued on Mar. 20, 1973 to K. Murai et al. Other methods of preparation will be apparent to those skilled in the art. Alternatively, dibenzylidene sorbitol is supplied by New Japan Chemical Company under the trade name Gell All-D. The gellant is employed in quantities sufficient to produce a composition having a gel strength (measured on a Brookfield Helipath H) within the range of $1 \times 10^6$ to $10 \times 10^6$ cps., preferably about $7 \times 10^6$ cps., an optimum gel strength and viscosity for easy spreading and clean shipping and handling. The amount of gellant required to produce such viscosity will generally range from 0.5 to 10% by weight, preferably about 3-5%, depending upon such factors as the particular cellulosic derivative and amount thereof employed, the dyestuff used, the solids concentration, etc.

The remainder of the composition is the solvent. Any solvent capable of dissolving the particular dye components employed and being compatible with the gellant may be used in these systems however it is most desirable to choose a solvent which is slow drying, has low toxicity and does not have an offensive odor. Suitable solvents therefore include a broad range of alcohols, glycol ethers and esters, or mixtures thereof. However, for the reasons outlined above, solvents of the general formula $R(CH_2)_nOH$ where R is phenyl or cyclohexyl and n is 0 to 3 are preferred. Typical solvents of the latter class include benzyl alcohol, cyclohexanol, beta-phenethyl alcohol, n-methyl cyclohexanol and methyl benzyl alcohol. Particularly preferred is benzyl alcohol (also known as styrolyl alcohol). In addition to its ability to dissolve the dyes employed, benzyl alcohol is a particularly satisfactory solvent due to its properties of low toxicity, flammability and volatility as well as being a non-irritant to the skin. The benzyl alcohol may be used alone or other solvents (e.g. $C_1$-$C_5$ alcohols, particularly glycol ethers or esters such as Cellosolve or cellulose acetate) may be used in minor amounts (up to about 40% by weight of the benzyl alcohol) in addition to the benzyl alcohol in order to change the drying time or lower the cost. Additionally, other additives conventionally employed in stain formulations (e.g. waxes) may also be added to the present compositions.

The novel stain compositions here described are readily prepared by dissolving the dye in the solvent and adding thereto the cellulosic derivatives and gellant, if employed. The mixture is then heated to about 80° C. to ensure complete dissolution, after which the composition is allowed to cool to room temperature. Alternatively, other methods for dispersing the mixture and forming the preferred gelled composition may be employed. If the heating method is used to produce the gel, the mixture may be packed in the liquid form and allowed to gel in the particular packaging container. In this form, the stain may be stored for an indefinite period with no particular storage conditions required.

In applying the wood stain, the stain may be brushed or wiped onto the wood surface, shaded as desired and allowed to dry. Drying times on the order of about 4 to 7 hours to overnight should be allowed prior to any subsequent treatment of the surface, such as by topcoating with varnish or the like.

In the examples which follow, all parts are by weight and all temperatures in degrees Celsius unless otherwise noted.

EXAMPLE I

This example illustrates the preparation of an improved gelled nonpigmented wood stain in accordance with the preferred embodiment.

Four grams Orasol Brown 2RG were dissoved in 85 grams benzyl alcohol and 3.5 grams dibenzylidene sorbitol and 5 grams ethyl cellulose added thereto. The mixture was heated to about 80° C. over a period of about 20 minutes, poured into 16 ounce metal containers, covered and allowed to cool to room temperature. The resultant product had a viscosity of about $7 \times 10^6$ cps. and produced a uniform walnut stain, exhibiting no dye migration during drying, when applied to unprimed white ash, pine and fir panels.

In contrast, when a similar gelled stain which did not contain the ethyl cellulose was applied to unprimed pine and fir panels, migration of the dye resulting in a non-uniform appearance occurred during drying.

EXAMPLE II

Four additional gelled formulations were prepared using the procedure described in Example I but varying the components using proportions by weight as follows:

|  | A | B | C | D |
|---|---|---|---|---|
| Benzylidene sorbitol | 1 | 1 | 1.8 | 1.8 |
| Hydroxy propyl cellulose | 1 | — | — | — |
| Ethyl hydroxy propyl cellulose | — | 1 | — | — |
| Methyl Hydroxy butyl cellulose | — | — | 0.5 | 0.5 |
| Ethyl cellulose 90 cps | — | — | 0.8 | 0.1 |
| Orasol Red BE | 2.4 | 2.4 | 2.4 | 2.4 |
| Orasol Black CN | 2 | 2 | 2 | 2 |
| Neozapon Orange RE | 2.6 | 2.6 | 2.6 | 2.6 |
| Orasol Brown 2RA | 2 | 2 | 2 | 2 |
| Benzyl alcohol | 89 | 89 | 87.90 | 87.70 |

All of these compounds gelled upon cooling to a solid gel that could be easily applied by cloth or brush. Compounds A and B showed less tendency to crumble when the cloth was pressed onto the container and subsequently when applied onto the wood surfaces. Compounds A, B, and D when applied to a variety of soft and hard woods yielded stained surfaces which were completely uniform in appearance and free from defects caused by dye migration during the drying period.

Stain C showed a very slight tendency to fish eye on the soft wood panel only.

EXAMPLE III

A liquid stain was prepared using the procedure of Example I but eliminating the dibenzylidene sorbitol and using 93.5 grams benzyl alcohol. The stain was brushed onto unprimed hardwood panels, and, while not exhibiting the ease of application and quality of finish achieved with the gelled stain of Example I, the resulting panels were uniform in appearance with no dye migration occurring during drying.

EXAMPLE IV

The following example illustrates the levels of various cellulose fixatives which are effective in these novel stains.

Stain preparations were made according to the following general formula:

|  | Parts by Weight |
|---|---|
| Dye - Orasol Brown 2 GL | 5% |
| Benzyl alcohol | to 100% |
| Hydroxy propyl cellulose | as shown |
| Ethyl cellulose - 50 cps. | as shown |
| Benzylidene sorbitol | as shown |

|  | E | F | G | H | I | J | K | L | M | N | O |
|---|---|---|---|---|---|---|---|---|---|---|---|
| Benzylidene sorbitol | 1 | 1 | 1.5 | 1.5 | 1.5 | 1.5 | 1.5 | 2 | 2 | 2 | 2 |
| Hydroxy propyl cellulose | 0.5 | 1 | 0.5 | 1 | — | — | — | 0.5 | 1 | 1 | 1 |
| Ethyl cellulose | — | — | — | — | 0.5 | 1 | 2 | — | — | 0.5 | 1 |

These stains were applied onto unprimed fir plywood panels. All preparations containing hydroxy propyl cellulose showed uniform dye fixation and were totally free of defects as was preparation K containing 2% ethyl cellulose. Formulations I and J did not, however, yield a firm gel at these low levels of ethyl cellulose content.

EXAMPLE V

For comparative purposes, five other benzyl alcohol soluble polymeric materials were used in place of ethyl cellulose in the formulation of Example I. Unprimed wood panels were stained with these formulations and the results observed are shown in Table I.

TABLE I

| Polymeric-fixative | Added Amount | Treated Wood | Observation |
|---|---|---|---|
| Polyvinyl pyrrolidone | 3% | pine | non-uniform |
| Polyvinyl pyrrolidone | 3% | fir | non-uniform |
| Polyvinyl acetate | 2.5% | pine | non-uniform |
| Methyl methacrylate | 2.5% | pine | non-uniform |
| Nitrocellulose | 2.5% | pine | non-uniform |
| Tung oil | 5% | fir | interferred with dye solubility. |

EXAMPLE VI

Three additional formulations were prepared using a variety of solvents in accordance with the present invention.

Thus, the general procedure described in Example I was repeated using the components and amounts shown in Table II.

TABLE II

| | | | |
|---|---|---|---|
| Benzyl alcohol | 436.5 | — | — |
| Methyl benzyl alcohol | — | 463.5 | — |
| Cyclohexanol | — | — | 463.5 |
| Hydroxypropyl cellulose | 4.5 | 4.5 | 4.5 |
| Benzylidene sorbitol | 7.0 | 7.0 | 7.0 |
| Neozopan Green 3G | 7.78 | 7.78 | * |
| Orasol Red 2 BL | 5.78 | 5.78 | * |
| Neozapon Orange RE | 5.78 | 8.67 | * |
| Orasol Black CN | 2.77 | 2.77 | * |
| Viscosity (cps) | | | |
| (spindle F @ 0.5 rpm) | $7.172 \times 10^6$ | $6.686 \times 10^6$ | $7.260 \times 10^6$ |
| (spindle F @ 1.0 rpm) | $6.525 \times 10^6$ | $6.287 \times 10^6$ | $7.732 \times 10^6$ |

*Tested without dye to show capatibility of the solvents.

I claim:
1. A gelled nonpigmented wood stain composition comprising:
   (a) from 0.1 to 10% by weight of at least one solvent soluble dye;
   (b) at least one cellulosic polymer selected from the group consisting of methyl cellulose, ethyl cellulose, hydroxyethyl cellulose, ethyl hydroxyethyl cellulose, hydroxypropyl cellulose, hydroxybutyl methyl cellulose, ethyl hydroxypropyl cellulose and methyl hydroxypropyl cellulose in an effective amount ranging from 0.2 to 10% by weight; and
   (c) from 0.5 to 10% by weight of dibenzylidene sorbitol;
   (d) the remainder of the composition comprising a suitable solvent.
2. The composition of claim 1, characterized in that the cellulosic polymer is selected from the group consisting of methyl cellulose, hydroxyethyl cellulose, ethyl hydroxyethyl cellulose, hydroxypropyl cellulose, and hydroxybutyl methyl cellulose.

3. The composition of claim 1 wherein the cellulosic polymer is a $C_3$ or $C_4$ substituted cellulose ether.

4. The composition of claim 2 wherein the cellulosic polymer is present in an amount of 0.2 to 1.6% by weight.

5. The composition of claim 1 wherein the cellulosic polymer is ethyl cellulose and is used in an amount of at least 2% by weight.

6. The composition of claim 1 wherein the dye is present in an amount of 0.1 to 8% by weight.

7. The composition of claim 1 wherein the dibenzylidene sorbitol is present in an amount sufficient to produce a composition having a gel strength within the range of $1 \times 10^6$ to $10 \times 10^6$ cps.

8. The composition of claim 1 wherein the dibenzylidene sorbitol is present in an amount sufficient to produce a composition having gel strength of about $7 \times 10^6$ cps.

9. The composition of claim 1 wherein the solvent is an alcohol or a glycol ether or ester.

10. The composition of claim 9 wherein the solvent is characterized by the formula $R(CH_2)_nOH$ wherein R is phenyl or cyclohexyl and n is 0 to 3.

11. The composition of claim 10 wherein the solvent is cyclohexanol or methyl benzyl alcohol.

12. The composition of claim 10 wherein the solvent is benzyl alcohol or benzyl alcohol with $C_1$-$C_5$ alcohols, or glycol ethers or esters or cellulose acetate replacing up to 40% by weight of the benzyl alcohol.

13. A process for staining wood comprising applying thereto a nonpigmented wood stain composition comprising:
(a) from 0.1 to 10% by weight of at least one solvent soluble dye;
(b) at least one cellulosic polymer selected from the group consisting of methyl cellulose, hydroxypropyl cellulose, hydroxybutyl methyl cellulose, ethyl hydroxypropyl cellulose and methyl hydroxypropyl cellulose in an effective amount ranging from 0.2 to 10% by weight; and
(c) from 0.5 to 10% by weight of dibenzylidene sorbitol,
(d) the remainder of the composition comprising a suitable solvent.

* * * * *

UNITED STATES PATENT AND TRADEMARK OFFICE
CERTIFICATE OF CORRECTION

PATENT NO. : 4,477,282
DATED : October 16, 1984
INVENTOR(S) : Fernandez

It is certified that error appears in the above-identified patent and that said Letters Patent are hereby corrected as shown below:

At column 3, line 5, the molecular wieght of "125,000,000" should be -- 1,250,000 --.

Signed and Sealed this

Twenty-third Day of August, 1988

*Attest:*

DONALD J. QUIGG

*Attesting Officer*      *Commissioner of Patents and Trademarks*